US009540510B2

(12) United States Patent
Blok et al.

(10) Patent No.: US 9,540,510 B2
(45) Date of Patent: Jan. 10, 2017

(54) STABILIZED DYNAMICALLY VULCANIZED THERMOPLASTIC ELASTOMER COMPOSITIONS USEFUL IN FLUID BARRIER APPLICATIONS

(75) Inventors: Edward John Blok, Wadsworth, OH (US); Bruce Alan Harrington, Houston, TX (US); Yuichi Hara, Hiratsuka (JP); Shusaku Tomoi, Hiratsuka (JP)

(73) Assignees: The Yokohama Rubber Co., Ltd, Tokyo (JP); ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 13/140,080

(22) PCT Filed: Dec. 17, 2008

(86) PCT No.: PCT/US2008/087147
§ 371 (c)(1),
(2), (4) Date: Oct. 27, 2011

(87) PCT Pub. No.: WO2010/071642
PCT Pub. Date: Jun. 24, 2010

(65) Prior Publication Data
US 2012/0041108 A1 Feb. 16, 2012

(51) Int. Cl.
*C08L 77/00* (2006.01)
*C08L 51/00* (2006.01)
(Continued)

(52) U.S. Cl.
CPC .............. *C08L 77/00* (2013.01); *C08L 23/283* (2013.01); *C08L 51/00* (2013.01); *C08L 51/04* (2013.01);
(Continued)

(58) Field of Classification Search
CPC combination set(s) only.
See application file for complete search history.

(56) References Cited

U.S. PATENT DOCUMENTS 4,863,999 A * 9/1989 MacLeay ............... C08F 8/34
525/142
5,681,899 A 10/1997 Wang et al.
(Continued)

FOREIGN PATENT DOCUMENTS

EA 199800127 2/1998
EP 0722850 A1 7/1996
(Continued)

OTHER PUBLICATIONS

Ampacet Technical Service Report, 2001.*
(Continued)

*Primary Examiner* — Robert C Boyle
*Assistant Examiner* — Stephen Rieth
(74) *Attorney, Agent, or Firm* — Polsinelli PC (57) ABSTRACT

A stabilized, dynamically vulcanized thermoplastic elastomer composition comprising dispersed dynamically vulcanized particles of at least one first elastomer or rubber comprising halogenated isobutylene-containing elastomer and dispersed particles of at least one second elastomer or rubber comprising at least one functional group capable of reacting with and grafting to a polyamide, the particles of the at least one first and at least one second elastomers dispersed in a continuous thermoplastic polyamide or nylon resin matrix comprising at least one nylon homopolymer, nylon copolymer or mixture thereof, the composition or the at least one first elastomer further comprising at least one stabilizer against degradation induced by exposure to actinic, particularly ultraviolet, radiation. The compositions are preferably produced in a mixing extruder and are suitable for producing durable, flexible, thermoplastic elastomer fluid barrier films
(Continued)

or layers useful in industrial articles such as vehicle tire innerliners and hoses.

16 Claims, 2 Drawing Sheets

(51) Int. Cl.
| | |
|---|---|
| C08L 15/02 | (2006.01) |
| C08K 5/3475 | (2006.01) |
| C08K 5/101 | (2006.01) |
| C08L 23/28 | (2006.01) |
| C08L 51/04 | (2006.01) |
| C08L 51/06 | (2006.01) |
| C08L 51/08 | (2006.01) |
| C08L 53/02 | (2006.01) |
| C08L 55/02 | (2006.01) |
| C08K 5/00 | (2006.01) |
| C08L 9/02 | (2006.01) |
| C08L 15/00 | (2006.01) |

(52) U.S. Cl.
 CPC ............... *C08L 51/06* (2013.01); *C08L 51/08* (2013.01); *C08L 53/02* (2013.01); *C08L 55/02* (2013.01); *C08K 5/005* (2013.01); *C08K 5/101* (2013.01); *C08K 5/3475* (2013.01); *C08L 9/02* (2013.01); *C08L 15/00* (2013.01)

(56) References Cited

U.S. PATENT DOCUMENTS

| | | | |
|---|---|---|---|
| 6,062,283 A | 5/2000 | Watanabe et al. | |
| 6,079,466 A | 6/2000 | Watanabe et al. | |
| 6,239,275 B1 * | 5/2001 | Gupta et al. | 544/213 |
| 6,610,765 B1 | 8/2003 | Pfaendner et al. | |
| 6,843,939 B2 * | 1/2005 | Stretanski | C08K 5/1345 |
| | | | 252/405 |
| 6,908,956 B2 | 6/2005 | Sutoris et al. | |
| 2002/0099136 A1 | 7/2002 | Park et al. | |
| 2006/0223941 A1 | 10/2006 | Tsou et al. | |
| 2006/0252874 A1 | 11/2006 | Soeda et al. | |
| 2008/0275187 A1 | 11/2008 | Tsou et al. | |

FOREIGN PATENT DOCUMENTS

| | | |
|---|---|---|
| EP | 0857761 A1 | 8/1998 |
| EP | 0969039 A1 | 1/2000 |
| JP | 08-244402 A | 9/1996 |
| JP | 10-025375 A | 1/1998 |
| JP | 2002-518485 A | 6/2002 |
| JP | 2003-525316 A | 8/2003 |
| JP | 2007-537321 A | 12/2007 |
| RU | 2251562 C2 | 5/2005 |
| WO | WO-99/67223 A2 | 12/1999 |
| WO | WO-2005/113661 A1 | 12/2005 |
| WO | WO 2007050076 A1 * | 5/2007 |
| WO | WO 2007111584 A1 * | 10/2007 |
| WO | WO-2009/048472 A1 | 4/2009 |

OTHER PUBLICATIONS

BASF Performance Additives Brochure, 2011.*
BASF Irganox 1098 Technical Information, 2010.*
Johnson, A 1999, Invitation To Organic Chemistry, Sudbury, Mass: Jones and Bartlett Publishers, eBook Collection (EBSCOhost), EBSCOhost, viewed Sep. 26. 2013. pp. 543-545.*

* cited by examiner

STABILIZED DYNAMICALLY VULCANIZED THERMOPLASTIC ELASTOMER COMPOSITIONS USEFUL IN FLUID BARRIER APPLICATIONS

CROSS REFERENCE TO RELATED APPLICATIONS

This application is a National Phase filing under 35 U.S.C. §371 of PCT/US2008/087147 filed on Dec. 17, 2008, the entire contents of which are hereby incorporated by reference.

TECHNICAL FIELD

The present invention relates to thermoplastic elastomer compositions particularly useful for tire and other industrial rubber applications and processes for producing such compositions.

BACKGROUND ART

EP722850B1 discloses a low-permeability thermoplastic elastomer composition that is superior as a gas-barrier layer in pneumatic tires. This thermoplastic elastomer composition comprises a low-permeability thermoplastic matrix, such as polyamide or a blend of polyamides, in which there is dispersed a low-permeability rubber, such as brominated poly(isobutylene-co-paramethylstyrene), referred to hereinafter as BIMS. In EP857761A1 and EP969039A1, the viscosity ratio of the thermoplastic matrix and the dispersed rubber phase was specified both as a function of the volume fraction ratio and, independently, to be close to a value of one in order to produce a high concentration of small particle size vulcanized rubber particles dispersed in a thermoplastic phase. EP969039A1 further discloses that small particle size rubber dispersed in a thermoplastic resin matrix was important in order to achieve acceptable durability of the resulting composition, particularly where such compositions are intended to be used as innerliners in pneumatic tires.

Compositions exhibiting low gas permeability performance (i.e., functioning as a gas barrier) composed of thermoplastic resin/thermoplastic resin-based blends such as a high density polyethylene resin and nylon 6 or nylon 66 (HDPE/PA6.66), a polyethylene terephthalate and aromatic nylon (PET/MXD6), a polyethylene terephthalate and vinyl alcohol-ethylene copolymer (PET/EVOH), where one thermoplastic resin is layered over the other layer to form plural layers by molding, and processes for producing the same. An application regarding the use of such a composition as the innerliner layer of a tire is disclosed in Japanese Patent Application No. 7-55929. However, since these materials are thermoplastic resin/thermoplastic resin blends, while they are superior in gas barrier performance, they lack flexibility, and therefore, such films are subject to failure if they are used in a vehicle tire which is subject to significant stress and flexing.

Further, there are also examples of the use of a thermoplastic elastomer composed of a rubber and a thermoplastic resin for use as an innerliner or in a tire; see, Japanese Patent Application No. 8-183683, but in general, a flexible material of the type disclosed therein and having superior durability has low heat resistance. With a thermoplastic elastomer using a thermoplastic resin having a melting point less than the tire vulcanization temperature as a matrix, when the tire vulcanization bladder is released at the end of the tire vulcanization cycle, the tire inside surface is subject to appearance defects due to the thermoplastic resin sticking to or rubbing against the vulcanization bladder.

SUMMARY OF THE INVENTION

There is a continuing need to improve the stability and properties of dynamically vulcanized thermoplastic barrier films based on nylon and elastomers, particularly where the use of carbon black in the elastomer phase is avoided.

The limitations of the prior art approaches to achieving improved performance of the desirable compositions comprising a small particle size rubber domain dispersed in a thermoplastic matrix, the composition exhibiting improved gas or fluid barrier properties and desirable levels of strength and durability suitable for use in tires and hose applications suggest that there is a continuing need for improvements, as have been accomplished by use of the processes of the present invention.

A stabilized, dynamically vulcanized thermoplastic elastomer composition, the composition comprising dispersed particles of at least one first elastomer or rubber comprising halogenated isobutylene-containing elastomer and dispersed particles of at least one second elastomer or rubber comprising at least one functional group capable of reacting with and grafting to a polyamide, the particles of the at least one first and at least one second elastomers dispersed in a continuous thermoplastic polyamide or nylon resin matrix comprising at least one nylon homopolymer, nylon copolymer or mixture thereof, the composition or the at least one first elastomer further comprising at least one stabilizer against degradation induced by exposure to actinic radiation (i.e. ultraviolet ray exposure), the stabilizer selected from the group consisting of benzotriazoles, triazines, benzophenones, and esters of optionally substituted hydroxybenzoic acids, including their derivatives and dimers thereof.

The composition is preferably prepared according to a dynamic vulcanization process conducted in a suitable mixer, preferably a mixing extruder, more preferably a twin screw extruder, capable of applying shear to the polymer and elastomer components at elevated temperature, the process comprising the steps of: (1) dispersing in the halogenated elastomer at least one curing agent suitable for crosslinking the halogenated elastomer and optionally the at least one second elastomer or both, and further dispersing in the halogenated elastomer at least one stabilizer against ultraviolet degradation, the stabilizer selected from the group consisting of benzotriazoles, triazines, benzophenones, and esters of optionally substituted hydroxybenzoic acids, including their derivatives and dimers thereof, in order to obtain a pre-compounded halogenated elastomer composition, using shear conditions, mixing time and a temperature sufficient to substantially uniformly disperse the curing agent, but insufficient to cause substantial crosslinking of the halogenated elastomer that would prevent its subsequent flow and dispersion when added to the nylon under conditions of elevated temperature and shear;

(2) introducing at least one nylon homopolymer or copolymer and optionally at least one nylon thermal stabilizer or oxidative stabilizer or both, into the mixer and applying sufficient shear and heat to cause the nylon to melt and flow and the optional stabilizer to be dispersed in the nylon and form a nylon mixture;

(3) introducing at least one nylon plasticizer in an amount sufficient to preferably cause the viscosity of the nylon mixture to substantially match the viscosity of the pre-compounded halogenated elastomer at the temperature and under the shear conditions present in the mixer; (4) introducing the pre-compounded halogenated elastomer into the mixer and applying heat and shear in sufficient quantity to initiate dynamic vulcanization of the halogenated elastomer; (5) introducing the second elastomer and continuing the heating and shearing to substantially disperse the second elastomer and substantially complete the dynamic vulcanization of the halogenated elastomer; and delivering the dynamically vulcanized thermoplastic elastomer composition from the mixer.

The dynamic vulcanization process is preferably conducted in a twin-screw mixing extruder under controlled conditions of heat and shear with each of the elastomer(s) and other components of the composition introduced into the extruder at positions along the extruder screw to allow for optimum reaction and/or dispersion of the components in the nylon matrix. In one embodiment, the first elastomer or rubber is preferably introduced after plasticization of the nylon component(s) and before introduction of the second elastomer or rubber. The process efficiently produces a dynamically vulcanized composition having a preferred morphology including stable, small particles of vulcanized elastomer.

In a preferred embodiment, the ultraviolet stabilizer is selected from the group consisting of 3,5-di-t-butyl-4-hydroxybenzoic acid, hexadecyl ester; 2-(2'-hydroxy-3',5'-di-t-amylphenyl)benzotriazole; 2-[4,6-Bis-(2,4-dimethylphenyl)-1,3,5-triazin-2-yl]-5-(octyloxy)phenol; 2-(4,6-diphenyl-1,3,5-triazin-2-yl)-5-hexyloxy-phenol; reaction products of methyl 3-(3-(2H-benzotriazole-2-yl)-5-t-butyl-4-hydroxyphenyl)propionate with polyethylene glycol 300; and mixtures thereof.

In a still further preferred embodiment, the dynamically vulcanized composition further comprises one or more free-radical scavengers in addition to one or more UV absorber or stabilizer.

BEST MODE FOR CARRYING OUT THE INVENTION

Preferred applications of the present invention relate to thermoplastic elastomer compositions for tire innerliner and barrier films, more particularly to thermoplastic elastomer compositions exhibiting excellent durability and impermeability to fluids such as air, as well as to liquids. Preferred compositional features are directed to enhanced or maximized content of dispersed halogenated, preferably brominated, isobutylene elastomers in the form of vulcanized particles dispersed in a continuous polyamide thermoplastic matrix. Additionally, particularly preferred aspects of the invention relate to efficient mixing processes suitable for producing a thermoplastic elastomer composition capable of providing a rubber domain comprising small sized particles while such domains are also highly extensible and elastic. Furthermore, the invention includes processes for producing pneumatic tires and hoses using the above compositions. The preferred elastomer exhibits low-permeability and is preferably a polymer such as halogenated isobutylene-containing elastomers and particularly preferred are brominated elastomers, especially brominated paramethylstyrene-co-isobutylene polymers; especially preferred are bromobutyl elastomers exhibiting high content of the structure illustrated hereinafter below; and also preferred are commercial bromobutyl elastomers, or blends thereof with one or more of the aforementioned brominated elastomers with one another or with other polymers.

As used herein, the new numbering scheme for the Periodic Table Groups are as disclosed in Chemical and Engineering News, 63(5), 27 (1985). All molecular weights are weight average unless otherwise noted.

Throughout the entire specification, including the claims, the following terms shall have the indicated meanings:

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds such as a conjugated diene like isoprene.

Elastomer or elastomers as used herein, refers to any polymer or composition of polymers consistent with the ASTM D1566 definition. The terms may be used interchangeably with the term "rubber(s)."

Substituted refers to the substitution of at least one hydrogen of the chemical compound or constituent.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

First Elastomer

The present invention comprises at least one halogenated isobutylene-containing rubber. Typically, it is present in a composition with a thermoplastic resin described hereinbelow, in a weight ratio of rubber to resin of about 55/45 to 80/20; preferably about 60/40 to about 75/25; more preferably about 65/35 to about 75/25. Halogenated rubber is defined as a rubber having at least about 0.1 mole % halogen, such halogen selected from the group consisting of bromine, chlorine and iodine. Preferred halogenated rubbers useful in this invention include halogenated isobutylene-based homopolymers or copolymers. These polymers can be described as random copolymer of a $C_4$ to $C_7$ isomonoolefin derived unit, such as isobutylene derived unit, and at least one other polymerizable unit. In one embodiment of the invention, the halogenated isobutylene-based copolymer is a butyl-type rubber or branched butyl-type rubber, especially brominated versions of these elastomers.

Butyl rubbers are typically prepared by reacting a mixture of monomers, the mixture having at least (1) a $C_4$ to $C_{12}$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene and dichlorostyrene are also suitable for homopolymerization or copolymerization in butyl rubbers. One embodiment of the butyl rubber polymer useful in the invention is obtained by reacting 95 to 99.5 wt % of isobutylene with 0.5 to 8 wt % isoprene, or from 0.5 wt % to 5.0 wt % isoprene in yet another embodiment.

Halogenated butyl rubber is produced by the halogenation of the butyl rubber product described above. Halogenation can be carried out by any means, and the invention is not herein limited by the halogenation process. In one embodiment, the butyl rubber is halogenated in hexane diluent at from 4 to 60° C., using bromine ($Br_2$) or chlorine ($Cl_2$) as the halogenation agent. Post-treated halogenated butyl rubber can also be used, as disclosed in U.S. Pat. No. 4,288,575. The halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %.

Another useful embodiment of butyl rubber is halogenated, branched or "star-branched" butyl rubber. In one embodiment, the star-branched butyl rubber ("SBB") is a composition comprising butyl rubber and a polydiene or block copolymer. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene or branching agent used to make the SBB.

The SBB used may be halogenated. In one embodiment, the halogenated star-branched butyl rubber ("HSBB") comprises a butyl rubber, either halogenated or not, and a polydiene or block copolymer, either halogenated or not. In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

Another useful butyl rubbers are isoolefin/para-alkylstyrene copolymers that include random copolymers comprising a $C_4$ to $C_7$ isoolefin, such as isobutylene, and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90% by weight of the para-isomer. The "halo" group can be any halogen, desirably chlorine or bromine, most preferably bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Preferred isoolefin copolymers can include monomers selected from the group consisting of isobutylene or isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Preferred isoolefin copolymers may also further comprise multiolefins, preferably a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Desirable styrenic monomers in the isoolefin copolymer include styrene, methylstyrene, chlorostyrene, methoxystyrene, indene and indene derivatives, and combinations thereof.

Most useful of such copolymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed halogenated poly(isobutylene-co-p-methylstyrene) or brominated poly (isobutylene-co-p-methylstyrene) (BIMS), and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment of the invention, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM 01646, modified) is about 30 to about 60 Mooney units.

Secondary Elastomers

Optionally, other rubbers or elastomers can be used in combination with the halogenated isobutylene-containing elastomer. Such an optional rubber component includes high diene rubbers and their hydrates. High diene content rubbers or elastomers are also referred to as high diene monomer rubber. It is typically a rubber comprising typically at least 50 mole % of a C4-C12 diene monomer, typically at least about 60 mole % to about 100 mole %; more preferably at least about 70 mole % to about 100 mole %; more preferably at least about 80 mole % to about 100 mole %. Useful high diene monomer rubbers include homopolymers and copolymers of olefins or isoolefins and multiolefins, or homopolymers of multiolefins. Generally, other optional rubbers useful in the present invention include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR, olefin rubbers (for example, ethylene propylene rubbers (including both EPDM and EPM), maleic acid-modified ethylene propylene rubbers (M-EPM), butyl rubber (IIR), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

A second rubber component that is more efficient in reducing low temperature modulus than BIMS can be advantageous for improving low temperature performance of the overall composition. Preferably, the secondary rubber is based on functionalized rubbers exhibiting low glass transition temperatures, Tg, preferably less than −30° C. The low Tg contributes to reduced modulus (enhanced softness) of the secondary rubber at operating or use temperatures of products containing such rubbers, for example, tire innerliners, of about −20° C. or less. Suitable functionality includes maleic anhydride, acyllactam, or others that can readily react with amine functionality present in polyamides. The presence of chemically reactive functionality in such rubbers further promotes reactive compatibilization between the secondary rubber and polyamide leading to a small particle size dispersion of the rubber in the polyamide matrix, the particles exhibiting an average particle size of about 1 micron or less; preferably less than about 0.5 micron. The secondary rubber, dispersed in the polyamide matrix in the form of small particles, as noted, can optionally be cured, crosslinked or vulcanized, partially, substantially or fully, as described with regard to the halogenated or BIMS elastomer. Such crosslinking can be accomplished in the course of dispersing the secondary rubber in the polyamide matrix by using the same dynamic vulcanization method applied to the halogenated elastomer component. If dynamic vulcanization is used, it is also necessary to disperse a suitable curing agent or curing system in the secondary rubber in order to effect vulcanization during mixing and dispersion of the rubber. Alternatively, if the secondary rubber is susceptible to thermal crosslinking, it can be vulcanized by the application of sufficient thermal energy either during mixing and dispersion in a manner corresponding to dynamic vulcanization, or after it is dispersed in the form of small particles by providing sufficient thermal energy to accomplish such crosslinking after dispersion. In any event, it is preferred that the secondary rubber be dispersed in the polyamide matrix in the form of small particles having an average particle size of about 0.1 micron to about 1 micron; for example about 0.1 micron to about 0.75 micron; or about 0.1 micron to about 0.5 micron.

Thermoplastic Resin

For purposes of the present invention, a useful thermoplastic resin is defined to be any thermoplastic homopolymer, copolymer or mixture thereof having a Young's modulus of more than 500 MPa and, preferably, an air permeation coefficient of less than 60×10-12 cc cm/cm² sec cm Hg (at 30° C.), and, preferably, a melting point of about 170° C. to about 230° C., including, but not limited to, one or more of the following:

a) polyamide resins: nylon 6 (N6), nylon 66 (N66), nylon 46 (N46), nylon 11 (N11), nylon 12 (N12), nylon 6,10 (N610), nylon 6,12 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins (for illustration, not limitation: vinyl acetate (EVA), polyvinyl alcohol (PVA), vinyl alchohol/ethylene copolymer (EVOA), polyvinylidene chloride (PVDC), polyvinyl chloride (PVC), polyvinyl/polyvinylidene copolymer, polyvinylidene chloride/methacrylate copolymer;
f) cellulose resins: cellulose acetate, cellulose acetate butyrate;
g) fluorine resins: polyvinylidene fluoride (PVDF), polyvinyl fluoride (PVF), polychlorofluoroethylene (PCTFE), tetrafluoroethylene/ethylene copolymer (ETFE);
h) polyimide resins: aromatic polyimides);
i) polysulfones;
j) polyacetals;
k) polyactones;
l) polyphenylene oxide and polyphenylene sulfide;
m) styrene-maleic anhydride;
n) aromatic polyketones; and
o) mixtures of any and all of a) through n) inclusive as well as mixtures of any of the illustrative or exemplified thermoplastic resins within each of a) through n) inclusive.

For purposes of the present invention, this definition of thermoplastic resin excludes polymers of olefins, such as polyethylene and polypropylene.

Preferred thermoplastic resins include polyamide resins and mixtures thereof; particularly preferred resins include Nylon 6, Nylon 6/66 copolymer, Nylon 11, Nylon 12, Nylon 610, Nylon 612 and their blends. According to an alternative preferred embodiment of the present invention, the thermoplastic elastomer composition may be formulated using a thermoplastic resin component where the nylon resin component comprises Nylon 11 or Nylon 12, and Nylon 6/66 copolymer in a ratio of composition (ratio by weight) of about 10/90 to about 90/10; preferably about 30/70 to about 85/15. Such a thermoplastic elastomer composition based on blended resins can provide a thermoplastic elastomer composition having superior durability and appearance, e.g., of the cured surface of a tire innerliner as well as superior air retention properties, as well as demonstrating a good balance of these properties.

Other Components

Since the thermoplastic resin and the halogenated isobutylene-containing rubber differ significantly in solubility, a compatibilizing ingredient may be useful for the purposes of enhancing compatibility of these polymers. Furthermore, without wishing to be bound by theory, the fine rubber dispersions obtained in the compositions of the present invention may be the result, in part, of chemical reaction(s) between, e.g., benzylic bromine present in BIMS, or allylic halogen in halogenated butyl, and terminal amines in thermoplastic polyamides at the phase boundary between the dispersed rubber particles and the thermoplastic which are formed during mixing and potentially by modifying, in particular reducing, the surface tension between the rubber and thermoplastic resin components. The occurrence of interfacial reactions during blending and simultaneous reaction of two immiscible polymers can help to avoid coalescence of the small particle-size dispersed rubber phase, thereby leading to particularly fine dispersions of the rubber phase. At the same time, because of the interfacial stability in these reactive compatibilized immiscible systems, phase inversion of the higher concentration, lower viscosity polymer blend component, the rubber phase, is inhibited as a consequence of the stabilizing effect of interfacial compatibilization.

Secondary polymers may function as compatibilizers and can include ethylenically unsaturated nitrile-conjugated diene-based high saturation copolymer rubbers (HNBR), epoxylated natural rubbers (ENR), NBR, hydrin rubbers, acryl rubbers and mixtures thereof. Other compatibilizers include copolymers such as those having the structure of both or one of the thermoplastic resin and rubber polymer or a structure of a copolymer having an epoxy group, carbonyl group, halogen group, amine group, maleated group, oxazoline group, hydroxy group, etc. capable of reacting with the thermoplastic resin or rubber polymer. The secondary rubber can be selected based upon the type of the thermoplastic resin polymer and rubber polymer to be mixed. Such useful secondary rubbers include maleic anhydride grafted rubbers such as maleic anhydride grafted acrylonitrile-butadiene-styrene, maleic anhydride grafted ethylene-propylene-diene rubber, maleic anhydride grafted styrene-ethylene/butadiene-styrene, and the like and maleated ethylene copolymer rubbers such as maleated ethylene-propylene (EPM), maleated ethylene-butene, maleated ethylene-hexene, maleated ethylene-octene, maleated ethylene-decene, maleated ethylene-propylene-diene, maleated ethylene-vinyl acetate, maleated ethylene-methyl acrylate, maleated ethylene-ethyl acrylate, maleated ethylene-acrylic acid, and the like and mixtures thereof. Also potentially useful rubbers include EPDM/styrene, EPDM/acrylonitrile graft copolymer and their maleic acid-modified forms; styrene/maleic acid copolymer; reactive phenoxy thermoplastic resin; and their mixtures.

Examples of useful, preferred functional groups present in the secondary rubber include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used. Examples of particularly preferred functional groups include, but are not limited, to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2) oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Polymers suitable to make functionalized polymers useful herein include ethylene polymers and propylene polymers. Particularly preferred polymers include polymers of ethylene copolymerized with one or more of propylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such ethylene polymers are modified with maleic acid or maleic anhydride. Another class of particularly preferred polymers include polymers of propylene copolymerized with one or more of ethylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such propylene polymers are modified with maleic acid or maleic anhydride.

In a preferred embodiment, the polymer to be functionalized is grafted with maleic anhydride so the maleic anhydride is covalently bonded to the backbone polymer chain of the polymer. The anhydride functionality grafted onto the polymer may remain as an anhydride, may be oxidized into acid functional groups, and/or may be further reacted by processes known in the art to introduce other functional groups such as amides, amines, alcohols, and the like.

Another class of particularly preferred polymers include polymers of a C4 to C7 isoolefin (such as isobutylene) copolymerized with one or more of isoprene, isobutylene. Preferably such isobutylene polymers are modified with maleic acid or maleic anhydride. Particularly preferred functionalized polymer include maleated copolymers of isobutylene and isoprene, maleated copolymers of isobutylene and paramethylstyrne, maleated halobutyl type copolymers, maleated SBB type copolymers and maleated BIMS type copolymers. Various methods are known in the art that may be used for functionalizing polymers. These include, but are not limited to, selective oxidation, free radical grafting, ozonolysis, epoxidation, and the like.

Preferably, the functionalized polymer comprises maleic anhydride present at a concentration selected from the group consisting of less than about: 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, and 2 wt % maleic anhydride. Also preferably the level of maleic anhydride (MA) in the polymer-g-MA may be greater than about 0.1 wt %, preferably greater than about 0.5 wt %, alternately greater than about 1 wt % maleic anhydride. In a preferred embodiment, the functionalized polymer may comprise about 0.1 to about 10 wt % maleic anhydride; preferably about 0.25 to about 5 wt %; more preferably about 0.5 to about 4 wt %; still more preferably about 0.75 to about 3.5 wt %; such as about 1.5 to about 2.5 wt % of maleic anhydride. The functional group content of the grafted polymer may be determined by Fourier Transform Infrared (FTIR) spectroscopy based on a calibration with standards whose absolute functional group content has been determined.

By having another rubber, the overall rubber content, counting both BIMS rubber and at least one secondary rubber, can be increased in the thermoplastic elastomer composition while maintaining a desirable morphology including small particle size dispersion of the rubber components in the polyamide matrix. The increase in maximum rubber content can be realized particularly in view of the restricted coalescence of the BIMS particles when in the presence of an immiscible secondary rubber. Furthermore, by controlling the amount of the secondary rubber concentration at a low or minor level as described above, it is possible to avoid the need to cure or vulcanize the secondary rubber in order to substantially avoid or prevent its coalescence. This is particularly true since the secondary rubber is reactive in the presence of and with the polyamide and becomes substantially immobilized. Without the need to add curatives to the secondary rubber it is then unnecessary to pre-mix or to pre-compound it with curatives (although curatives can optionally be added and the secondary rubber dynamically vulcanized using the same technology as for BIMS), and direct addition of the secondary rubber to the extruder mixer is feasible during extrusion mixing; the secondary rubber preferably is provided in pellet form. Furthermore, since most functionalized rubbers, such as maleated ethylene copolymer rubbers and maleic anhydride grafted rubbers, are fairly permeable, it is desirable to keep the secondary rubber concentration low, typically not more than 20 wt %; preferably about 1 wt % to about 20 wt %; more preferably about 1 wt % to about 10 wt % or less, based on the total weight of the overall composition. The amount of the secondary, functionalized compatibilizer rubber blended is typically not more than about 20 wt %; preferably less than about 10 wt %; generally about 0.5 wt % to about 20 wt %; for example about 5 wt % to about 15 wt %; such as about 7.5 wt % to about 12.5 wt %.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." A cure system is used because typically more than one curing agent is employed for beneficial effects, particularly where a mixture of high diene rubber and a less reactive elastomer is used.

For purposes of dynamic vulcanization in the presence of a thermoplastic resin to form, for example, a highly impermeable layer or film, any conventional curative system which is capable of vulcanizing saturated or unsaturated halogenated polymers may be used to vulcanize at least the elastomeric halogenated copolymer of a C4 to C7 isomonoolefin and a para-alkylstyrene. Peroxide curatives are specifically excluded from the practice of this invention when there is present one or more thermoplastic resin would cause such the resins to crosslink themselves in the presence of peroxide, resulting in an excessively cured, non-thermoplastic composition. Crosslinking or curing agents include at least one of, e.g., sulfur, zinc oxide, and fatty acids and mixtures thereof. Generally, polymer compositions may be crosslinked by adding curative agents, for example sulfur, metal oxides (i.e., zinc oxide, ZnO), organometallic compounds, radical initiators, etc. and heating the composition or mixture. The following are common curatives that can function in the present invention: ZnO, CaO, MgO, Al2O3, CrO3, FeO, Fe2O3, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. Suitable curative systems for the elastomeric halogenated copolymer component of the present invention include zinc oxide in combination with zinc stearate or stearic acid and, optionally, one or more of the following accelerators or vulcanizing agents: Permalux, the di-ortho-tolylguanidine salt of dicatechol borate; HVA-2, m-phenylene bis maleimide; Zisnet, 2,4,6-trimercapto-5-triazine; ZDEDC, zinc diethyl dithiocarbamate and also including for the purposes of the present invention, other dithiocarbamates; Tetrone A, dipentamethylene thiuram hexasulfide; Vultac 5, alkylated phenol disulfide, SP1045, phenol formaldehyde resin; SP1056, brominated alkylphenol formaldehyde resin; DPPD, diphenyl phenylene diamine; salicylic acid, ortho-hydroxy benzoic acid; wood rosin, abietic acid; and TMTDS, tetramethyl thiuram disulfide, used in combination with sulfur.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally, all of the available curative is consumed in the formation of effective crosslinks which join individual polymer chains to one another and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio)benzothiazole (MBS or MOR), compositions of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea. Curatives, accelerators and the cure systems of which they are a part that are useful with one or more crosslinkable polymers are well-known in the art.

The cure system can be dispersed in a suitable concentration into the rubber component, the rubber component optionally containing one or more filler, extender and/or plasticizer by, e.g., mixing the rubber and the cure system components in a process step prior to addition of the rubber-containing composition to the thermoplastic using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization, although this is difficult to control in a commercial, practical, integrated process and is less desirable. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization. By so doing, the pre-compounded rubber composition can be pelletized for more efficient and effective feeding to the dynamic vulcanization equipment, preferably a mixing extruder, as described below.

In one embodiment of the invention, at least one curing agent is typically present at about 0.1 to about 15 phr; alternatively at about 0.5 to about 10 phr.

Useful combinations of curatives, cure modifiers and accelerators can be illustrated as follows: As a general rubber vulcanization agent, e.g., a sulfur vulcanization agent, powdered sulfur, precipitated sulfur, high dispersion sulfur, surface-treated sulfur, insoluble sulfur, dimorpholinedisulfide, alkylphenoldisulfide, and mixtures thereof. Such compounds may be used in an amount of about 0.5 phr to about 4 phr (parts by weight per 100 parts by weight of the elastomer component). Alternatively, where the use of such a material is feasible in view of other polymer and resin components present an organic peroxide vulcanization agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di(peroxylbenzoate), and mixtures thereof. When used, such curatives can be present at a level of about 1 phr to about 20 phr. Other useful curatives include phenol resin vulcanization agents such as a bromide of an alkylphenol resin or a mixed crosslinking agent system containing stannous chloride, chloroprene, or another halogen donor and an alkylphenol resin and mixtures thereof. Such agents can be used at a level of about 1 phr to, about 20 phr. Alternatively, other useful curing agents, cure modifiers and useful levels include zinc oxide and/or zinc stearate (about 0.05 phr to about 5 phr), stearin acid (about 0.1 phr to about 5 phr), magnesium oxide (about 0.5 phr to about 4 phr), lyserge (10 to 20 phr or so), p-quinonedioxime, p-dibenzoylquinonedioxime, tetrachloro-p-benzoquinone, poly-p-dinitrosobenzene (about 0.5 phr to about 10 phr), methylenedianiline (about 0.05 phr to about 10 phr), and mixtures thereof. Further, if desired or necessary, one or more of a vulcanization accelerator may be added in combination with the vulcanization agent, including for example, an aldehyde-ammonia, guanidine, thiazole, sulfenamide, thiuram, dithio acid salt, thiurea, and mixtures thereof, for example, in an amounts of about 0.1 phr to about 5 phr or more.

Elastomer components useful in the present, including in particular the BIMS component, may contain a low concentration of a free-radical absorbing antioxidant, although such elastomers may also be prepared without one, particularly if the product is produced in a form for improved compatibility with the nylon component. It is noted that free-radical absorbing additives are not typically referred to as UV absorbers or UV stabilizers, although if exposure to ultraviolet light results in the formation of a free-radical, the presence of a free-radical absorbing additive can improve stability of the composition. Free-radical absorbing additives can be used in combination with the primary additives of the present invention, the UV absorbers. Examples of useful commercial free-radical antioxidants include sterically hindered phenolic compounds such as N,N'-hexane-1,6-diylbis(3-(3,5-di-tert-butyl-4-hyroxyphenylpropionamide, pentaerythritol tetrakis(3-(3,5-di-tert-butyl-4-hydroxyphenyl)propionate, 2,2'-methylenebis(4-ethyl-6-tert-butylphenol), 2,2'-methylenebis-(4-methyl-6-tert-butylphenol), and the like and mixtures thereof. When employed in combination with the UV absorbers of the present invention, free-radical absorbers are typically used at a concentration of about 0.05 to about 1.0 parts per hundred rubber (phr); preferably about 0.1 to about 0.9 phr; more preferably about 0.2 to about 0.8 phr; still more preferably about 0.25 to about 0.7 phr; for example, about 0.3 to about 0.6 phr; or about 0.25 to about 0.50 phr; or about 0.25 to about 0.35 phr. Alternatively, when at least one antioxidant is used in combination with a UV absorber in compositions of the present invention, such antioxidant is present at a concentration, in phr, selected from the group consisting of about: 0.05, 0.1, 0.15, 0.20, 0.25, 0.30, 0.35, 0.40, 0.45, 0.50, 0.55, 0.60, 0.65, 0.70, 0.75, 0.80, 0.90, 1.0 and 1.1. Furthermore, one or more antioxidant can be used at a concentration in a range selected from any two of the preceding values.

Elastomers useful in the present invention, particularly the BIMS component, do not typically contain an ultraviolet or UV stabilizer. Additionally, since the use to which compositions of the present invention are to be put typically include inside surfaces of articles such as tires (innerliners) and hoses, such compositions would not typically include a UV stabilizer, as the composition is typically not exposed, or only minimally exposed, to ultraviolet rays or light. Thus the use of at least one (for example one or more) UV absorber or stabilizer in such compositions would not be typical. Alternatively, if a composition is prepared that includes carbon black, it is generally accepted that the carbon black can function as a UV absorber, thus obviating the further need for a chemical additive to serve that function. However, the addition of carbon black has other consequences since when it is used at concentrations that which provide reinforcement, in other words as a reinforcing filler, it also increases the viscosity of the composition, which can negatively impact dispersion of the elastomer components) of the present invention. Consequently, while incorporation of a UV stabilizer in compositions similar to those discussed above would not be expected or the norm, the use of such materials has been found to provide an unexpected benefit in terms of performance of the resulting thin film, fluid or air barrier composition, particularly in terms of improved long term performance of the barrier film, such as reduced cracking and reduced tackiness at the surface of the film, while maintaining the flow, molding, strength and fluid barrier properties of the dynamically vulcanized composition. In accordance with the present invention, UV stabilizers or absorbers can be added to the elastomer and/or the thermoplastic resin at any point during pre-compounding, compounding or mixing of the thermoplastic elastomer.

Various UV stabilizers or absorbers are commercially available and may be useful. These materials may be referenced as both UV "absorbers" and as "stabilizers" since the effect of using such materials is to improve the stability of the resulting composition. Several classes of such absorbers are preferred because they are less basic and tend to interfere less with the curing or crosslinking reaction of the halogenated elastomer component, particularly a BIMS elastomer. Further in this regard, it is noteworthy that one class of UV absorbers typically used in polymer compositions, namely hindered amine light stabilizers (known in the art by the acronym HALS) is not suitable for use in the present invention and is not a preferred absorber in the present invention. In one embodiment, HALS are not present in the inventive composition and the use thereof is specifically and intentionally excluded in such an embodiment. Furthermore, a preferred UV absorber additive of the present invention is one that when added to the elastomer or BIMS component prior to the dynamic vulcanization process will tend to remain dispersed in the dynamically vulcanized elastomer phase during subsequent cure of the tire or hose containing the fluid barrier film in which it is present.

Particularly preferred UV absorbers and stabilizers are selected from the group consisting of compounds which are chemically identified as benzotriazoles, triazines, benzophenones, and esters of optionally substituted hydroxybenzoic acids, including their derivatives, dimers and mixtures thereof. The hydroxybenzoic acid compounds are suitable additives for use in the present invention, but they are not typically characterized as UV absorbers. Instead they are understood to be compounds that react with and destroy free radicals, sometimes referred to as free-radical scavengers, where such free-radicals may be generated in a composition by exposure to actinic radiation, including UV light. Suitable free radical scavengers, absorbers or stabilizers of this class can be selected on the basis that they do not interfere with the cure response of the elastomers, particularly the BIMS elastomer, to the extent that the dynamic vulcanization process is inhibited under the process conditions employed for preparing the composition and/or that the barrier film has insufficient strength or UV resistance for the application to which it is put. Consequently, suitable free radical scavengers do not include aromatic amines, hindered amine light stabilizers or HALS and phenolic free-radical scavengers containing reactive amine or amide groups. Several classes of UV absorbers and light stabilizers suitable for use herein are disclosed in U.S. Pat. No. 5,021,478, the disclosure of which is incorporated herein to the extent permitted.

The class of benzotriazole compounds includes many commercial compounds and is particularly preferred.

Benzotriazoles include those compounds illustrated by the following structure:

wherein independently X is H or Cl, $R_1$ is H or alkyl and $R_2$ is alkyl, in each instance alkyl includes linear or branched, substituted or unsubstituted $C_1$-$C_{12}$, including phenyl substitution thereon.

Other suitable compounds in this class include: 2-(2'-hydroxyphenyl)-benzotriazoles, for example, the 5'-methyl-, 3',5'-di-tert-butyl-, 5'-tert-butyl-, 5'-(1,1,3,3-tetramethylbutyl)-, 5-chloro-3',5'-di-tertbutyl-, 5-chloro-3'-tert-butyl-5'-methyl-, 3'-sec-butyl-, 5'-tert-butyl-, 4'-octoxy; 3',5'-di-tert-amyl-, alpha-dimethylbenzyl), 3'-tert-butyl-5'-(2-(omega-hydroxyocta-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives, and the like and mixtures thereof. Suitable commercially available, examples include 2-(2'-hydroxy-5'-octylphenyl)benzotriazole (Cyasorb® UV 5411; Cytec Industries) and 2-(2'-hydroxy-3',5'-di-t-amylphenyl)benzotriazole (Cyasorb® UV 2337; Cytec Industries). Suitable UV absorber products also include: the reaction products of methyl 3-(3-(2H-benzotriazole-2-yl)-5-t-butyl-4-hydroxyphenyl)propionate and polyethylene glycol (TINUVIN® 213; CIBA Specialty Chemicals); 2-(2H-benzotriazol-2-yl)-4,6-bis(1-methyl-1-phenylethyl)phenol (TINUVIN® 234; CIBA Specialty Chemicals); 2-benzotriazol-2-yl-4,6-di-tert-butylphenol (TINUVIN® 320; CIBA Specialty Chemicals); 2-(5-chloro-2H-benzotriazole-2-yl)-6-(1,1-dimethylethyl)-4-methylphenol (TINUVIN® 326; CIBA Specialty Chemicals); 2,4 di-tert-butyl-6-(5-chlorobenzotriazole-2-yl)phenol (TINUVIN® 327; CIBA Specialty Chemicals); 2-(2H-benzotriazol-2-yl)-4,6-ditert-pentylphenol (TINUVIN® 328; CIBA Specialty Chemicals); 2-(2H-benzotriazol-2-yl)-4-(1,1,3,3-tetramethylbutyl)phenol (TINUVIN® 329; CIBA Specialty Chemicals); 2-(2H-benxotriazol-2-yl)-4-(tert-butyl)-6-(sec-butyl)phenol (TINUVIN® 350; CIBA Specialty Chemicals); 2,2'-methylenebis(6-(2-(2H-benzotriazol-2-yl)-4-1,1,3,3-tetramethylbutyl)phenol (TINUVIN® 360; CIBA Specialty Chemicals); 2-(2H-benzotriazole-2-yl)-6-dodecyl-4-methylphenol, branched and linear (TINUVIN® 571; CIBA Specialty Chemicals); and 2-(2H-benzotriazol-2-yl)-p-cresol, also referred to as 2-benzotriazol-2-yl-4-methyl-phenol (TINUVIN® 2; CIBA Specialty Chemicals); and the like and mixtures thereof.

Useful benzophenones include those compounds illustrated by the following structure:

wherein R is H or alkyl.

Other suitable compounds in this class include: 2-hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives. Suitable commercially available examples include: 2-hydroxy-4-methoxybenzophenone (Cyasorb® UV-9); 2,2'-dihydroxy-4-methoxybenzophenone (Cyasorb® UV-24); 2-hydroxy-4-n-octoxybenzophenone (Cyasorb® UV-531); poly-4-2-acryloxyethoxy)-2-hydroxybenzophenone (Cyasorb® UV-2126); 2-hydroxy-4-(octyloxy)benzophenone, also referred to as methanone, 2-hydroxy-4-octyloxy-phenyl (Chimassorb® 81); and the like and mixtures thereof, each of the aforementioned compounds are available from Cytec Industries, West Paterson, N.J.

Useful triazines include compounds exemplified, but not limited to, the following structure (available commercially as Tinuvin® 1577, Ciba Specialty Chemicals):

Other suitable compounds in this class include: hydroxyphenyl-s-triazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxyethoxy(phenyl]-6-(4-chlorophenyl)-s-triazine; 2,4-bis[2-hydroxy-4-(2-hydroxyethoxy)phenyl]-6-phenyl-s-triazine; 2,4-bis[2-hydroxy 4-(2-hydroxyethoxy)phenyl]-6-(2,4-dimethylphenyl)-s-triazine; 2,4-bis[2-hydroxy-4-(2-hydroxyethoxy)phenyl]-6-(4-bromophenyl)-s-triazine; 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine. Other suitable commercially available examples include: 2-[4,6-Bis-(2,4-dimethylphenyl)-1,3,5-triazin-2-yl]-5-(octyloxy)phenol (Cyasorb® UV 1164) and the like and mixtures thereof.

Useful hydroxybenzoic acids include compounds exemplified, but not limited to, the following structure, 3,5-di-t-butyl-4-hydroxybenzoic acid, hexadecyl ester (available commercially as Cyasorb® 2908, Cytec Industries):

Other suitable compounds in this class include: esters of optionally substituted benzoic acids for example, phenyl salicylate, 4-tert-butylphenyl salicylate, octylphenyl salicylate, dibenzoylresorcinol, bis-(4-tertbutylbenzoyl)-resorcinol, benzoylresorcinol, 3,5-di-tertbutyl-4-hydroxybenzoic acid 2,4-di-tert-butylphenyl ester and 3,5-di-tert-butyl-4-hydroxybenzoic acid hexadecyl ester, and the like and mixtures thereof.

Other UV absorbers are also available from R.T. Vanderbilt Company, Inc., under the brand names Songlight® and Songsorb® as various grades.

The UV absorbers can be used in amounts suitable for the halogenated elastomer(s) and secondary elastomer(s) used in the composition, which amounts can be determined using standard cure response tests as described herein in order to identify the type and amount of stabilizer that interferes the least, or to an acceptable level or not at all, with the crosslinking of the elastomer(s). In other words, the combination of the stabilizer(s) selected and the curatives used for dynamic vulcanization and otherwise, for example to optionally cure the secondary elastomer, should provide a state of cure that results in satisfactory physical properties, such as tensile strength, and stability, such as aged strength and surface condition of the barrier film. Typically, one absorber or a mixture of absorbers are useful at concentrations of a maximum of about 10 phr, 8.0 phr, 7.5 phr, 6 phr, 5 phr, 3.5 phr, 2.0 phr, 1.75 phr, 1.5 phr, and minimums of about 0.1 phr, 0.2 phr, 0.3 phr, 0.5 phr, 0.75 phr, 1.0 phr, 1.5 phr, 1.175 phr; with suitable ranges including any one of the above maximums in combination with any one of the above minimums. Suitable ranges include, but are not limited to: 0.1 to about 10 phr; about 0.1 to 8.0 phr; 0.1 to about 7.5 phr; 0.1 to about 5.0 phr; 0.1 to about 3.5 phr; about 0.2 to about 6.5 phr; about 0.25 to about 5.0; about 0.25 to about 3.5 phr; for example about 0.25 to about 2.0 phr; or about 0.25 to about 1.75 phr; or about 0.25 to about 1.5 phr. Furthermore, one or more absorber can be used at a concentration in a range selected from any two of the preceding values.

The compositions described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black, and the like. Reinforcing grade carbon black is preferred. A particularly useful grade of carbon black is Mitsubishi Carbon Black grade MA600, also identified as a medium color furnace black. However, carbon black, if used at all, is typically no more than about 5 parts per hundred of rubber (phr); preferably less than about 4 phr; more preferably less than about 3 phr; most preferably less than about 2 phr; for example, about 1 phr or less, such as about 0.1 to about 1.5 phr; for example about 0.25 to about 1.0 phr. Alternatively, useful compositions can be prepared without carbon black. The filler may also include other reinforcing or non-reinforcing materials such as silica, clay, calcium carbonate, talc, titanium dioxide and the like. The filler may be present at a level of from 0 to about 5 percent by weight of the rubber present in the composition; such as about 0.5 to about 4 wt. %; or about 1.0 to about 3 wt. %; such as about 1 to about 2 wt %.

A process or plasticizer oil may be present in air barrier compositions. Such oils are primarily used to improve the processing of the composition during preparation of the layer, e.g., mixing, calendering, etc. Generally, the process oil may be selected from paraffinic oils, aromatic oils, naphthenic oils, and polybutene oils. Rubber process oils also have ASTM designations depending on whether they fall into the class of paraffinic, naphthenic or aromatic hydrocarbonaceous process oils. The type of process oil utilized will be that customarily used in conjunction with a type of elastomer component and a skilled rubber chemist mill recognize which type of oil should be utilized with a particular rubber in a particular application. For a thermoplastic elastomer composition the oil may be present at a level of 0 to about 20 wt % of the total composition; preferably oil is not included in order to maximize impermeability of the composition.

Minimizing or reducing the viscosity difference between the rubber or BIMS component and thermoplastic or nylon components during mixing and/or processing enhances uniform mixing and fine blend morphology, in other words small, dispersed particles of vulcanized rubber, that significantly enhance good blend mechanical as well as desired permeability properties. However, as a consequence of the flow activation and shear thinning characteristic typical of BIMS polymers, reduced viscosity values of BIMS polymers at the elevated temperatures and shear rates encountered during mixing are much more pronounced than the reductions in viscosity of the thermoplastic component with which the BIMS polymer typically is blended. Thus, in view of the lower viscosity of BIMS at high shear rates and temperatures, to obtain viscosity of the nylon component(s) to be similar to that of the rubber, it is useful to select either low molecular weight grades of nylon having lower viscosity or one or more nylon in combination with plasticizer, or a combination of both approaches, to achieve the desired viscosity during mixing. Having the nylon resin phase viscosity match or approach that of the BIMS polymer phase can improve the dispersed particle size and overall morphology of dynamically vulcanized BIMS and nylon blends. However, depending on the nature of the polymer selection or modifications, these alternatives may result in undesirable mechanical properties, for example, as a consequence of the use of lower molecular weight nylons, and/or higher permeability as a consequence of the use of a typical nylon plasticizer, depending on the amount and type of plasticizer used.

An alternative approach to lowering the viscosity of the nylon phase uses low molecular weight polyamide polymers as plasticizers. In this way, it is possible to use medium and high molecular weight nylons and thus maintain mechanical properties of the resulting vulcanized BIMS and nylon dynamically vulcanized blends and furthermore, since low molecular weight polyamides exhibit relatively low permeability, the resulting dynamically vulcanized blends do not have their permeability properties significantly reduced. Such materials typically have a molecular weight of less than about 20,000 Daltons; such as about 1,000 to about 18,000 Daltons; preferably about 3,000 to about 17,000 Daltons and have flash points greater than about 250° C., brittleness temperatures of less than about −20° C., and softening temperature of less than bout 180° C. Furthermore, useful low molecular weight amides exhibit a viscosity at 200° C. of less than about 15 Pascal-seconds (Pa-s); alternatively about 0.05 to about 12 Pa-s; preferably about 0.2 to, about 10 Pa-s.

In addition, plasticizers such as organic esters and other synthetic plasticizers can be used. A particularly preferred plasticizer for use in a DVA composition is N-butylsulfonamide or other plasticizers suitable for polyamides. Nylon plasticizers include, but are not limited to, lactams such as caprolactam and lauryl lactam; and sulfonamides, such as o,p-toluene sulfonamide, n-ethyl o,p-toluene sulfonamide, trimellitates, phthalates, adipates, phosphates, and glycolates. Exemplary plasticizers can be selected from the group consisting of phthalate plasticizers, adipate plasticizers, phosphate plasticizers, glycolate plasticizers, sulfonamide plasticizers, trimellitate plasticizers and polymeric plasticizers, particularly low molecular weight nylons. Preferred plasticizers are selected from the group consisting of phthalate plasticizers, adipate plasticizers, and sulfonamide plasticizers. Examples of suitable plasticizers include dibutyl phthalate, dicyclohexyl phthalate, diethyl phthalate, diisodecyl phthalate, dimethyl phthalate, di(2-ethylhexyl)phthalate, diphenyl phthalate, diundecyl phthalate, mixed $C_7$-$C_{11}$ dialkyl phthalate, butyl benzyl phthalate, benzyl phthalate, di(2-ethylhexyl)adipate, 0.25 mixed $C_7$-$C_9$ dialkyl adipate, tributoxyethyl phosphate, tributyl phosphate, tricresyl phosphate, triphenyl phosphate, cresyl diphenyl phosphate, 2-ethylhexyl diphenyl phosphate, isodecyl diphenyl phosphate, butyl phthalyl butyl glycolate, methyl phthalyl ethyl glycolate and mixed $C_7$-$C_9$ alkyl trimellitate. Sulfonamide plasticizers comprise a preferred class of plasticizers for polyamides, including for example, N-butyl benzylsulfonamide, N-cyclohexyl-p-toluenesulfonamide, o,p-toluenesulfonamide, N-ethyl-o,p-toluenesulfonamide and N-ethyl-o-toluenesulfonamide. In another embodiment, rubber process oils such as naphthenic, aromatic or paraffinic extender oils may be present at about 1 to about 5 phr. In still another embodiment, naphthenic, aliphatic, paraffinic and other aromatic oils are substantially absent from the composition. By "substantially absent", it is meant that naphthenic, aliphatic, paraffinic and other aromatic oils may be present, if at all, to an extent no greater than 2 phr in the composition.

As a consequence of steps taken according to the above description, the nylon containing phase and the elastomer containing phase, particularly in which BIMS is present, have viscosities at the elevated temperature and shear conditions of dynamic vulcanization that are within about 35% of one another; preferably about 30% of one another; more preferably about 25% of one another; still more preferably about 20% of one another; most preferably about 15% of one another; such as about 10% or less of one another, for example within about 1, 3, 5, 7 or 8% of one another; ideally their viscosities under dynamic vulcanization conditions are the same.

The preferred polymer components comprise halogenated isobutylene-containing copolymers as the vulcanizable component(s), e.g., halogenated butyl such as chlorinated butyl or brominated butyl, and brominated isobutylene-p-methylstyrene copolymer (BIMS, copolymer), and a thermoplastic polymer such as nylon or a blend of various nylon polymers. It is particularly preferred that the dynamically vulcanized compositions of the present invention comprise the halogenated rubber component(s) in the form of dispersed, substantially fully cured, small particles in a continuous matrix of thermoplastic. The dynamically vulcanized halogenated rubber component is preferably dispersed in the polyamide matrix in the form of small particles having an average particle size of about 0.1 micron to about 1 micron; for example about 0.1 micron to about 0.75 micron; or about 0.1 micron to about 0.5 micron. Particle size can be determined by methods well known in the art and including tapping phase atomic force microscopy (AFM).

For purposes of the present invention, the BIMS component is also referred to as a low-grafting efficiency elastomer and the secondary rubbers are referred to as high-grafting efficiency rubbers. In each instance, grafting refers to grafting onto the polyamide(s) that are present in the composition. This distinction in efficiency and the method for measuring the performance of the polymers are described further below.

Having described each of the components useful in the thermoplastic elastomeric composition of the present invention, the following paragraphs describe the efficient methods for producing such compositions.

When the method known as "dynamic vulcanization" is used, the process of dispersing the cure system as described hereinafter. Generally, the term "dynamic vulcanization" is used to denote a vulcanization process in which a thermoplastic resin and at least one vulcanizable rubber are mixed under conditions of high shear and elevated temperature in the presence of a curing agent or curing system for the rubber(s). As a result, the rubber is simultaneously cross-linked and dispersed as particles, preferably in the form of a microgel, within the resin which forms or is present as a continuous matrix. The resulting composition is known in the art as a "dynamically vulcanized alloy" or DVA. Typically, dynamic vulcanization is effected by mixing the ingredients at a temperature which is at or above the curing temperature of the rubber, and at or above the melting temperature of the resin. The unique characteristic of the dynamically vulcanized or cured composition is that, notwithstanding the fact that the rubber is cured the composition can be processed and reprocessed by conventional thermoplastic processing techniques such as extrusion, injection molding, compression molding, etc. Scrap and or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. However, the dynamic vulcanization process can be modified; as described below, in order to achieve further advantages.

It will be appreciated that the vulcanizable rubber, typically the first rubber, for example the halogenated isobutylene elastomer such as BIMS (or a mixture of such rubbers), will be cured to at least 50% of the maximum state of cure of which it is capable based on the cure system, time and temperature, and typically, the state of cure of such rubber will exceed 50% of maximum cure. Since the second rubber can also comprise a vulcanizable rubber, where such second rubber is vulcanized, for example according to dynamic vulcanization technology as described herein, it too typically will be cured to at least 50% of the maximum state of cure of which it is capable based on its curative or cure system and the time and temperature at which it is processed. Alternatively, as discussed herein, such second rubber can also be grafted, linked and/or associated with the polyamide resin, with or without the use of curatives, so that its state of cure is not a limitation, provided that it is sufficiently dispersed in a small enough particle size so as to provide the properties desired for the use to which the composition will be put. Conversely, it may be desirable to cure the rubber particles to less than the maximum state of cure of which the rubber is capable so that the flexibility, as measured, for example, by Young's modulus, of the rubber component(s) is at a suitable level for the end-use to which the composition is to be put, e.g., a tire innerliner or hose component. Consequently, it may be desirable to control the state of cure of the rubber(s) used in the composition to be less than or equal to about 95% of the maximum degree of cure of which they are capable, as described above.

Dynamic vulcanization can be carried out in various types of commercial equipment generally available in the rubber and plastics industry including Banbury® internal mixers, roll mixers, and mixing extruders. A preferred mixing device is a twin-screw extruder with intermeshing screws. Mixing is generally conducted under such time and temperature conditions that the dispersed rubber particles, particularly the first rubber component, are dispersed and cured and/or interact with the polyamide to the extent necessary to maintain their stability, i.e., to avoid coalescence of such particles at the completion of mixing the composition. A suitable range of dynamic vulcanization temperatures is typically from about the melting temperature of the resin(s) to less than about 300° C.; for example, the temperature may range from about the melting temperature of the matrix resin(s) to about 275° C.; preferably about 230° C. to about 265° C.; alternatively, about 235° C. to about 260° C.; such as about 240° C. to about 260° C.; for example, about 230° C. to about 250° C. Alternatively, dynamic vulcanization can be carried out at a temperature range from about 10° C. to about 50° C. above the melting temperature of the matrix resin; more preferably about 20° C. to about 40° C. above the melting temperature of the polyamide or mixed polyamide thermoplastic matrix. A mixing extruder typically is comprised of multiple barrel sections, each of which can be temperature controlled and the function of each can be varied, for example, as a feed section, mixing section, cooling section, melt section, etc. Consequently, the temperature in each section can be controlled to effect the most appropriate conditions for melting, mixing, dispersing and curing of the components that are fed upstream or within each section. For example, temperatures in upstream-most sections can be elevated in order to promote heating, melting and dispersion of the polyamide(s), and polyamide stabilizers and plasticizers which are typically fed in the first section(s) of the extruder, for example about 230° C. to about 250° C. This can be followed by temperatures appropriate for mixing, dispersion and dynamic vulcanization of the BIMS-containing component, for example about 200° C. to about 230° C., and thereafter temperatures appropriate for mixing and dispersion of the second elastomer and for delivery of the mixed composition from the mixing extruder, for example about 190° C. to about 220° C. These temperatures are for purposes of exemplification only since specific values can be selected based on the particular polyamide type(s) and grade(s), the particular cure system used to dynamically vulcanize the BIMS, or other halogenated isobutylene-containing, component as well as the specific type of second rubber, its activity and whether it is dynamically vulcanized or dispersed without dynamic vulcanization.

In one embodiment of the present invention the necessary or suitable amount of crosslinking agent(s) or cure system is dispersed in the elastomer component(s) by mixing the crosslinking agent capable of crosslinking the elastomer component(s) which are desired to form the vulcanized, dispersed phase, into the elastomer component at a low to moderate temperature, insufficient to substantially activate the cure system, prior to contacting the thus compounded or accelerated elastomer component(s) with the resin component(s) for the purpose of carrying out dynamic vulcanization of the mixture. By this method the crosslinking agent does not substantially react with the rubber, nor does it have an opportunity to partially react with the thermoplastic resin to cause either molecular weight degradation or crosslinking of the resin. Furthermore, control of the crosslinking rate and extent of crosslinking of the elastomer component is more readily achieved. Consequently, the compositions of the present invention exhibit improved properties.

For example, a mixing device such as a Banbury mixer, two-roll rubber mill, etc., is used to pre-mix or pre-compound the elastomer component comprising the halogenated elastomer with a predetermined amount of crosslinking agent or "system," the latter referring to a multi-component mixture of curatives, particularly if a combination of cross-linking agent and accelerator is used, until a substantially uniform dispersion is obtained. Additionally, in a preferred embodiment, at least one ultraviolet stabilizer is also dispersed in the halogenated elastomer. At this time, the elastomer component may have added thereto, if desired, suitable amounts of optional fillers such as carbon black or modified carbon black, clay or modified clay oil and/or plasticizer. As noted above, during this phase of mixing the temperature is controlled at a low enough level for the particular elastomer(s) selected and in consideration of the activity of the cure system, to effectively disperse the rubber phase components and to avoid premature crosslinking of the elastomers. A useful temperature during the mixing step for dispersing the curatives or cure system can be less than about 120° C.

Having several components present in the thermoplastic elastomer composition, including one or more polyamides, vulcanizable BIMS elastomer, and at least one secondary rubber, it would ordinarily be necessary to include multiple mixing steps or stages in the overall process in order to provide sufficient distributed and dispersive mixing as well as dynamic vulcanization. Typically the BIMS rubber is pre-compounded with curatives and UV stabilizer(s) using an internal mixer such as a Banbury or a rubber mill and it is pelletized. In prior art processes each individual polyamide component is typically pre-mixed with plasticizer and stabilizers using a twin-screw extruder and pelletized. Finally, the pre-compounded BIMS rubber pellets, pre-blended polyamide pellets, and the secondary rubber pellets are metered or fed into a twin-screw extruder for extrusion mixing and dynamic vulcanization. Such multi-step mixing and intermediate cooling and pelletizing steps are costly, subject to production errors and lead to significant inventory in intermediate stages during production.

In contrast, the dynamic vulcanization process of the present invention is modified from such typical prior art process. In one embodiment of the present invention there is provided a reduction in the number of mixing steps required to produce the stabilized thermoplastic elastomer composition of the present invention having excellent morphology for applications such as tire innerliners and other industrial applications using barrier films. In particular, mixing preferably utilizes twin-screw extrusion mixing processes, particularly a one-step twin screw mixing process, to produce a thermoplastic elastomer composition based on blends of polyamides with reactive compatibilized elastomers, including BIMS elastomer, secondary elastomers and UV stabilizer(s), as described above.

In the processes of the present invention, mixing and dynamic vulcanization is preferably conducted in a twin-screw mixing extruder, commercial examples of which are readily available and well-known in the art. Shear rate at the time of mixing is typically greater than about 500 sec$^{-1}$; preferably about 500 to about 7500 sec$^{-1}$; alternatively, about 1000 to about 7500 sec$^{-1}$; for example about 2000 to about 7500 sec$^{-1}$. Such extruders need only be equipped to allow for multiple feed ports corresponding to the various components of the overall composition and the restrictions described in detail hereinafter. Furthermore, the mixing screws need only be adapted to provide for a mixing region following each of the feed ports and an appropriate length following introduction of all of the ingredients so that dynamic vulcanization can be carried out and completed to the extent desired using the polymeric components and BIMS vulcanizing agents or cure system selected. Such features are readily determined by one skilled in the art with limited experimentation based on the teachings herein. Alternatively, mixing and dynamic vulcanization can be conducted in any suitable mixing equipment in which the various components can be introduced and mixed and in which dynamic vulcanization can be conducted. For example, a Banbury internal mixer can be used to receive each of the components or mixtures of components so that they can be mixed and dispersed and such a mixing device can be used to carry out dynamic vulcanization at elevated temperature. For convenience and efficient processing it is preferred to use an extruder, more preferably a twin-screw, co-rotating, intermeshing mixing extruder comprising suitable feed, mixing, cooling and delivery zones consistent with the teachings herein.

In a preferred mixing sequence the polyamide component(s), their stabilizers and plasticizers can be introduced into upstream feed ports of the extruder; these components need not be pre-mixed or pre-blended. Sufficient length along the screw should be provided to allow for the mixing and dispersion of the stabilizer and plasticizer in the polyamide phase. Mixing variations are available, such as adding stabilizer(s) with the nylon or dispersing stabilizer(s) with the nylon plasticizer (if the latter is used) and adding a mixture of stabilizers plus plasticizer to the nylon after its mixing has begun. If necessary, a cooling zone can be provided in order to avoid excessive heating of the polyamide such that its viscosity becomes undesirably low before it is mixed with the BIMS. In other words, as discussed above, for efficient mixing and dispersion of the BIMS in the polyamide, it is preferred that their viscosity of the polyamide and its stabilizer and plasticizer, and BIMS and its curatives and fillers and plasticizers, if any, be approximately the same (substantially "matched") at the time that they are mixed with one another and dynamic vulcanization is initiated. As described above, the BIMS rubber is typically pre-compounded with curatives, also referred to as "accelerated," as well as having the UV stabilizer(s) dispersed in it, for example using an internal mixer such as a Banbury or a rubber mill and, for ease of feeding or metering, it typically is pelletized. As discussed above, temperature should be controlled in order to avoid too low a temperature and the resulting high viscosity of the polymers mixtures and the concomitant power requirement. Similarly, too high a temperature would result in excessively low viscosity, particularly of the polyamide mixture and possible degradation as well as poor mixing with the BIMS composition. A useful temperature range is about 230° C. to about 250° C.; preferably not lower than about 210° C. or higher than about 275° C.

Downstream of the BIMS feed port there is provided a feed port for the secondary rubber in pelletized form, the secondary rubber also referred to as the high grafting efficiency rubber. It is particularly preferred that the two rubber components not be fed to the mixing extruder together in order to avoid inadvertent coalescence of rubber particles that are formed in the extruder. Furthermore, since the BIMS rubber exhibits a lower grafting efficiency it is fed first in order to provide additional time for grafting to the polyamide concurrently with its dynamic vulcanization, dispersion and curing reaction. In contrast, the secondary rubber, exhibiting a higher grafting efficiency can be fed at a point further downstream and closer to the exit of the extruder since it reacts more quickly and more readily grafts to the polyamide.

Overall time of mixing for dynamic vulcanization can be about 30 seconds to about 8 minutes; for example about 45 seconds to about 6 minutes; such as about 1 minute to about 4 minutes. However, mixing time can, and preferably should be adjusted as needed to produce a dynamically vulcanized composition that exhibits suitably small and stable elastomer particle size(s) and an overall composition that exhibits the target physical and/or permeability properties based on the first and second rubbers used and also considering whether or not the second rubber is dynamically vulcanized, as discussed above. The selection of mixing time, overall or in each portion or stage of the process associated with addition of the various components as described above, is readily determined by a person skilled in the art of polymer mixing, particularly extrusion mixing, based on the principles and detailed information provided herein.

The thermoplastic elastomer composition thus obtained is structured with the elastomer component forming a discontinuous phase dispersed as a dispersion phase (domain) in a matrix of the nylon resin which forms a continuous phase. As a consequence of dynamic vulcanization, the composition remains thermoplastic and a film, layer or sheet-like structure of the composition can be formed using ordinary molding, extrusion or calendering.

By molding the thermoplastic elastomer composition obtained into a sheet, film, or tube using a T-sheeting die, straight or crosshead structure tubing die, inflation molding cylindrical die, etc. at the end of a single-screw extruder, or by calendering, it is possible to use the composition as the air permeation preventive layer, e.g., an innerliner, of a pneumatic tire and as a component or layer of a hose, etc. The thermoplastic elastomer compositions of the present invention may be taken up into strands once, pelletized, then molded by using a single-screw extruder that is typically used for resin.

The sheet or tubular molded article thus obtained can be effectively used for an innerliner layer of a pneumatic tire or the hose tube or hose cover of a low gas permeable hose. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled.

EXAMPLES

The following commercially available products were used for the components employed in the Examples:

TABLE 1

| Material Designation | Material | Commercial Name/ Potential Source (if applicable) |
|---|---|---|
| BIMS | brominated poly (isobutylene-co-paramethylstyrene) | Exxpro 89-4; ExxonMobil Chemical |
| N6 | Nylon 6 | UBE 1030B; Ube |
| N6/66 | Nylon 6/66 copolymer | UBE 5033B; Ube |
| N11 | Nylon 11 | BESN; Atochem |
| Plasticizer | N-butylsulfonamide | Uniplex ® 214, Unitex Chemical Corporation |
| Antioxiciant | N,N'-hexane-1,6-diylbis[3-(3,5-di-tert-butyl-4-hydroxyphenyl) propionamide | Irganox ® 1098; Ciba Speciality Chemicals |
| HALS 1 | Polymer of dimethyl succinate and 2,2,6,6-tetramethyl-4-hydroxy-1-hydroxyethylpiperidine; identified as oligomeric butanedioic acid, dimethylester, polymer with 4-hydroxy-2,2,6,6-tetramethyl-1-piperidine ethanol; molecular weight 3100-4000 | Tinuvin 622LD; Ciba Speciality Chemicals |
| HALS 2 | decanedioic acid, bis(2,2,6,6-tetramethyl-1-(octyloxy)-4-piperidinyl) ester, reaction products with 1,1-dimethylethylhdroperoxide and octane | Tinuvin 123; Ciba Speciality Chemicals |
| HALS 3 | 2-(2H-benzotriazol-2-yl)-4,6-bis(1-methyl-1-phenylethyl)phenol | Tinuvin 234; Ciba Speciality Chemicals |
| UV absorber 1 | 2-(2'-hydroxy-3',5'-di-t-amylphenyl) benzotriazole | Cyasorb ® UV 2337; Cytec Industries |
| UV absorber 2 | 3,5-di-t-butyl-4-hydroxybenzoic acid, hexadecyl ester | Cyasorb ® UV 2908; Cytec Industries |
| ZnO | Zinc oxide | Kadox 911; Horsehead Corporation |
| Stearic acid | Stearic acid | F1000 |
| Zinc Stearate | Zinc stearate | Zinc Stearate D |
| MEEA | Maleated ethylene ethyl acrylate | AR201; Mitsui-DuPont |
| MAE | Maleic anhydride functionalized ethylene copolymer | Exxelor 1840; ExxonMobil Chemical |
| Talc | talc | SG-2000; Nippon |

A standard composition, subsequently referred to as the BIMS masterbatch, containing the ingredients in Table 2 was prepared by dispersing the ingredients in a Banbury internal mixer at a temperature and for a time that did not cause premature curing of the BIMS, but instead dispersed the ingredients, which in combination comprise a cure system for the elastomer.

TABLE 2

| Ingredients | Parts by weight | Parts per hundred rubber (phr) |
|---|---|---|
| Stearic Acid | 0.787 | 0.600 |
| Zinc Stearate | 0.393 | 0.300 |
| ZnO | 0.195 | 0.149 |
| BIMS | 128.15 | 100 |

The cure response of the composition of Table 2 (tested in duplicate) was evaluated using a Moving Die Rheometer (MDR, Alpha Technologies), applying ±1° die oscillation amplitude. Additionally, duplicate samples were tested for cure response in which an antioxidant and a HALS UV absorber were evaluated individually and in combination. The compositions are summarized in Table 3 below and illustrated in FIG. 1.

TABLE 3

| | Composition | | | |
|---|---|---|---|---|
| Ingredient | A/H | B/C | D/E | F/G |
| BIMS Masterbatch* | 101.5 | 101.5 | 101.5 | 101.5 |
| Antioxidant | — | 0.315 | — | 0.315 |
| HALS 1 | — | — | 0.126 | 0.126 |

*Composition of Table 1 including cure system; duplicate samples of each composition tested The antioxidant and HALS additives were dispersed in samples of the BIMS mastermatch using a Brabender® mixer at 160-165° C., 60 RPM, mixing chamber blanketed with nitrogen.

Figure 1:
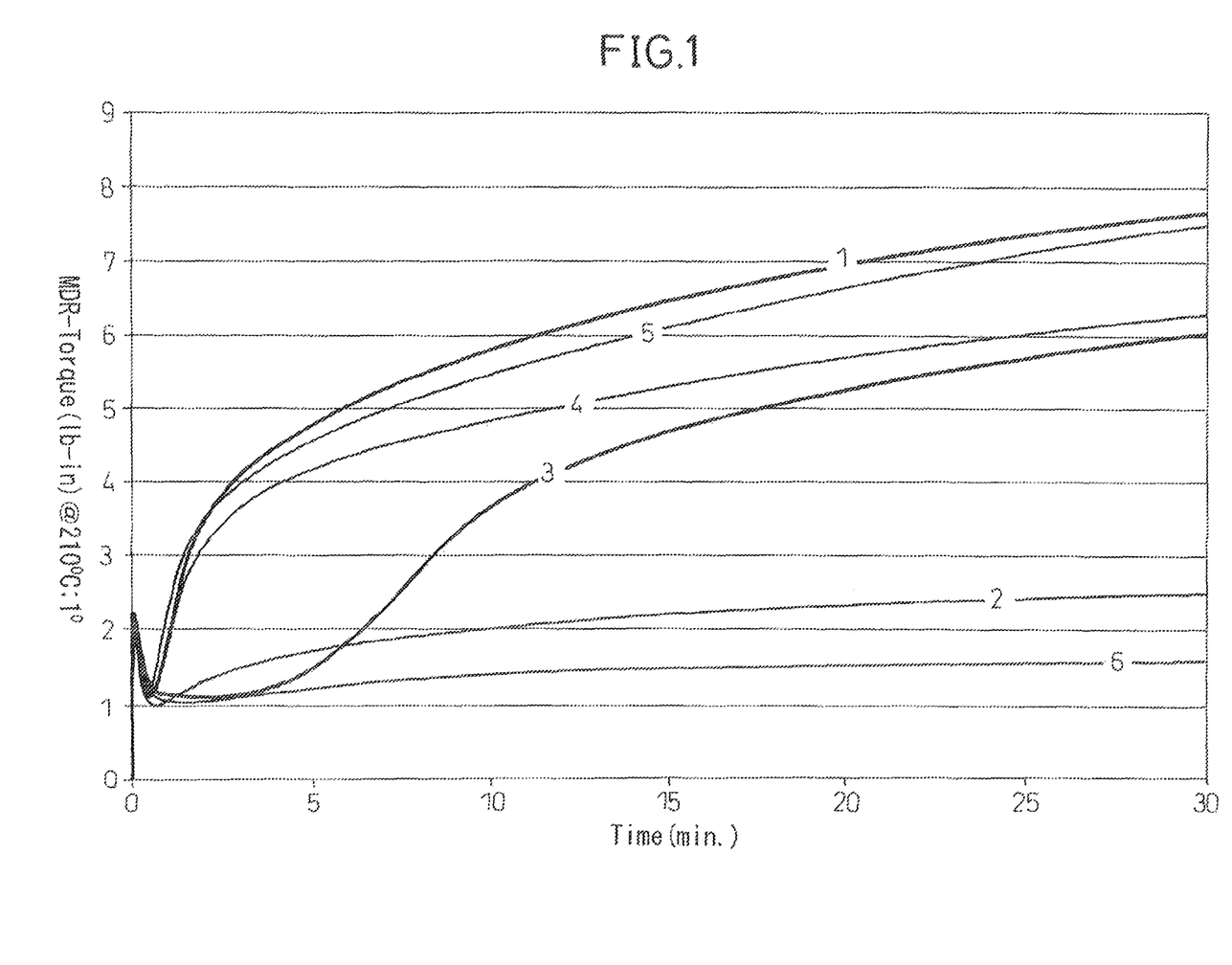
FIG. 1 illustrates MDR cure response curves for BIMS with typical stabilizers.

As can be seen in FIG. 1, the addition of the phenolic antioxidant resulted in delayed onset of curing (the time at which the torque curve begins to rise above its minimum), but the maximum value achieved is similar to that of the unmodified composition. In contrast, incorporation of the HALS, either alone or in combination with the antioxidant, resulted in not only delayed onset of curing but a significant reduction in the level of torque achieved, suggesting both a reduced rate and a reduced state of crosslinking, particularly at the concentrations evaluated. Generally, a phenolic antioxidant is not considered to be an effective UV absorber or stabilizer, but it can be a useful supplemental additive when used in combination with one or more suitable UV absorbers described in the present invention.

The BIMS masterbatch of Table 2 was used to evaluate the effect on cure response of the masterbatch of compositions with different UV absorbers, stabilizers and antioxidants. Cure response of the compositions in Table 4 was tested using a Moving Die Rheometer (MDR, Alpha Technologies), applying ±1° die oscillation amplitude.

TABLE 4

| Ingredient* | 1 | 2 | 3 | 4 | 5 | 6 |
|---|---|---|---|---|---|---|
| BIMS Masterbatch* | 101.5 | 101.5 | 101.5 | 101.5 | 101.5 | 101.5 |
| HALS 2 | — | 1.5 | — | — | — | — |

TABLE 4-continued

| Ingredient* | 1 | 2 | 3 | 4 | 5 | 6 |
|---|---|---|---|---|---|---|
| Antioxidant | — | — | 1.5 | — | — | — |
| UV absorber 1 | — | — | — | 1.5 | — | — |
| UV absorber 2 | — | — | — | — | 1.5 | — |
| HALS 1 | — | — | — | — | — | 1.5 |

*BIMS Masterbatch composition of Table 1 including cure system; duplicate sample tested with each of compositions 2/3 and 4/5

Stabilizers were dispersed in the BIMS masterbatch using a mixer at 160° C., 60 RPM, mixing chamber blanketed with nitrogen; BIMS was masticated for 2 minutes prior to addition of additives and the composition was then mixed for an additional 3 minutes.

Figure 2:
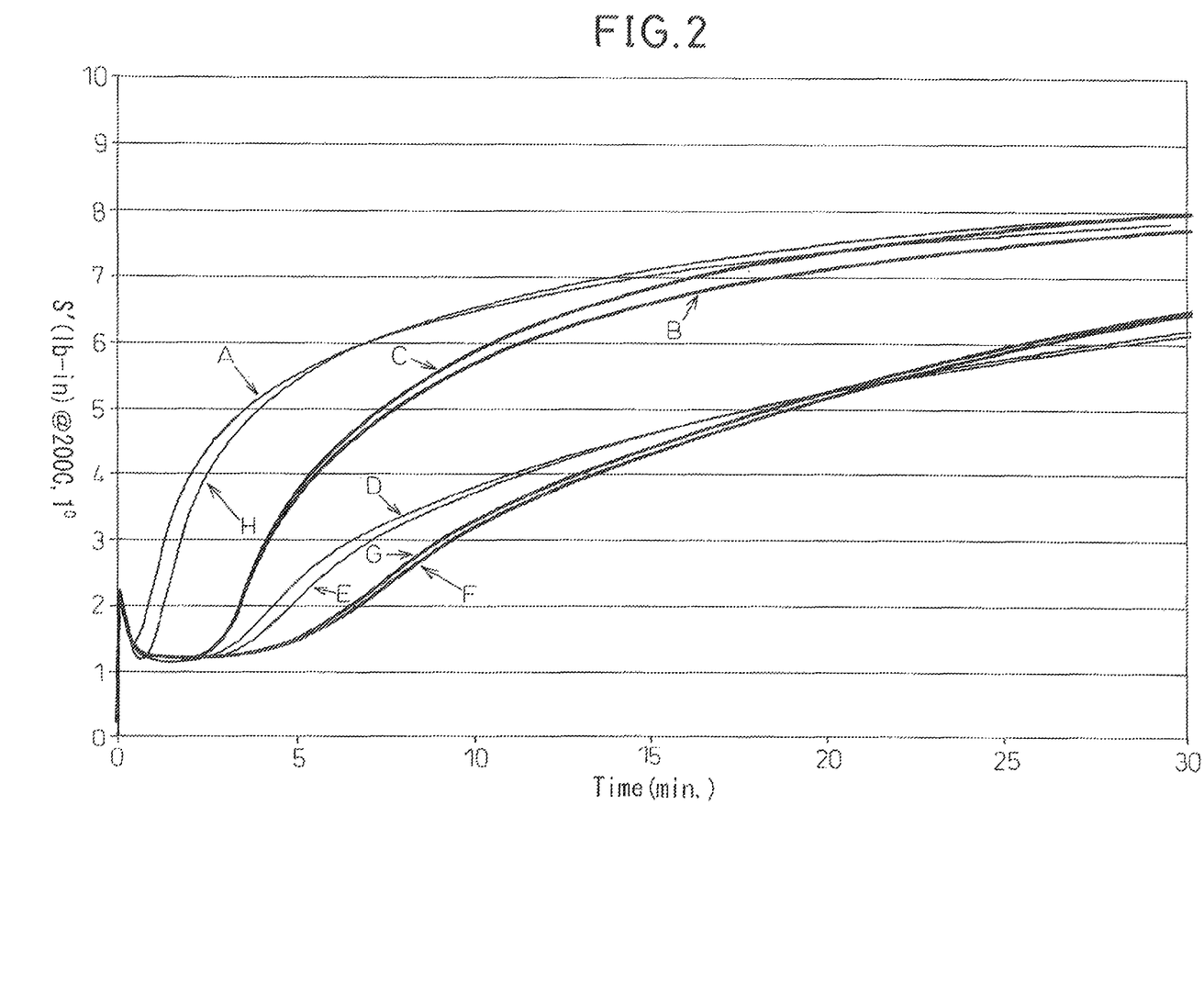
FIG. 2 illustrates MDR cure response curves for BIMS with UV absorbers of the invention and comparative stabilizers.

The effect of the stabilizers on the cure response of the BIMS is shown in FIG. 2, based on testing the cure response at 210° C. using the same test method as reported above. As the cure response of each composition illustrates, hindered amine light stabilizers (HALS) and amide functionalized free radical scavengers are unsuitable because they depress the cure state of the BIMS, which should be substantially fully vulcanized during the dynamic vulcanization process. Without wishing to be bound by theory, it is believed that the negative effect on cure response is due to the basic nature of these materials and the resulting interference with the curing reaction of the BIMS.

Samples were prepared and evaluated for surface tack after 10 days of UV exposure at 1875 kJ/m$^2$ at 340 nm under the test conditions specified in SAE J1960. Tack was determined by a subjective evaluation wherein 1=best (least tack) and 10=worst (most tack) compared to unexposed samples. Surface tackiness is believed to be a consequence of polymer degradation due to the UV energy absorbed. The results are summarized in the following Table 5:

TABLE 5

| Surface Tack Rating Following UV Exposure | | |
|---|---|---|
| Composition Additive* | Additive Concentration (phr) | Surface Tack Rating |
| Control | — | 9, 8, 8** |
| Carbon Black | 3/6 | 1/1 |
| CuI*** | 0.031 | 9 |
| UV absorber 1 | 1.5 | 6.5 |
| UV absorber 2 | 1.5 | 8 |
| HALS 2 | 1.5 | 7 |
| HALS 2/UV absorber 2 | 1.5/1.5 | 3 |
| UV absorber 1/UV absorber 2 | 1.5/1.5 | 2 |
| HALS 2/UV absorber 2 | 0.75/0.75 | 6 |
| UV absorber 1/UV absorber 2 | 0.75/0.75 | 6 |

*Control composition as in Table 1; no antioxidant or UV absorber
**Triplicate test results
***Stabilizer typically present in nylon component Although the use of carbon black gave desirable (low) surface tack results, incorporation of carbon black, particularly at the levels in this screening test, would be expected to detrimentally affect both particle size and uniformity of dispersion of the dynamically vulcanized elastomer component in the nylon matrix. Furthermore, the use of carbon black in a barrier film composition would preclude other coloration of such a barrier film. Its use in this test was primarily for purposes of a reference or control. Other than the carbon black containing samples, the blended UV absorbers resulted in the best surface tack performance, with the UV absorber 1 directionally improved compared to the HALS 3 and the higher concentrations providing better results.

A composition containing blended UV absorbers were prepared and tested for tensile strength following UV aging as well as low temperature flex resistance. The compositions are shown in the following Table 6:

TABLE 6

| Ingredient | Control* (phr) | Example (phr) |
|---|---|---|
| Rubber Masterbatch | | |
| BIMS Masterbatch (Table 2) | 100.00 | 100.00 |
| ZnO | 0.15 | 0.15 |
| Zinc Stearate | 0.30 | 0.30 |
| Stearic Acid | 0.60 | 0.60 |
| Talc | 2.00 | 2.00 |
| Nylon Masterbatch | | |
| Antioxidant | 0.315 | 0.315 |
| HALS 1 | 0.126 | 0.126 |
| CuI | .031 | .031 |
| Nylon 6,66 | 62.97 | 62.97 |
| Plasticizer | 26.99 | 26.99 |
| Secondary Rubber | | |
| MEEA | 10.05 | 10.05 |
| UV Absorbers | | |
| UV absorber 1 | — | 1.5 |
| UV absorber 2 | — | 1.5 |
| Test Results** | | |
| Tensile Strength, psi | 1800 | 1650 |
| Aged Tensile Strength, psi | 500 | 1100 |
| Low Temperature Fatigue | 167,644/182,278 | 319,260 |

*Tested in duplicate
**Tensile test: ASTM D-412 using British Standard dies; dynamically vulcanized samples molded 10 min.@410° F. (210° C.) (using a combination of 2 min.@ 1 ton and 8 min. @ 15 tons pressure) followed by cooling for 15 min.

Molded plaques cut in half; one half retained as control, second half aged. After aging all samples placed in humidity chamber (90% RH, 50° C.) for 24 hrs.; all samples conditioned for 24 hrs. at about 68° F. (20° C.) prior to testing. Median value of 5 samples.

UV Aging Conditions: 1875 kJ/m2 @340 nm per SAE J1960.

Low Temperature Fatigue (LTF): Tests are conducted using a Constant Stress/Strain Fatigue Tester manufactured by Ueshima Seisakusho Co. Test specimens are cut from 1 mm thick extruded cast film using a JIS #3 die; material dried 16 hrs. at 150° C. A total of ten specimens are tested at one time @ −35° C., 5 Hz frequency, 40% total displacement. The machine records the number of cycles at which a specimen is broken. A characteristic cycle number (at 63% percentile) from Weibull distribution analysis is reported as the Low Temperature Fatigue value.

Additional formulations were prepared as shown in Table 7.

TABLE 7

| Formulation | F2 | F3 | F4 | F5 |
|---|---|---|---|---|
| Elastomers | | | | |
| BIMS | 100 | 100 | 100 | 100 |
| ZnO | 0.15 | 0.15 | 0.15 | 0.15 |
| Stearic Acid | 0.60 | 0.60 | 0.60 | 0.60 |
| Zinc Stearate | 0.30 | 0.30 | 0.30 | 0.30 |
| MEAA | 9.2 | 0 | 0 | 10.1 |
| MAE | 0 | 10.0 | 10.0 | 0 |
| Plastics | | | | |
| N6/66 | 29.5 | 69.2 | 62.4 | 63.0 |
| N11 | 44.3 | 0 | 0 | 0 |

TABLE 7-continued

| Formulation | F2 | F3 | F4 | F5 |
|---|---|---|---|---|
| Plasticizer | | | | |
| Plasticizer Stabilizer | 8.2 | 20.7 | 26.8 | 27.0 |
| Antioxidant | 0.37 | 0.37 | 0.31 | 0.32 |
| HALS 1 | 0.15 | 0.15 | 0.13 | 0.13 |
| CuI | 0.04 | 0.04 | 0.03 | 0.03 |

Any range of numbers recited in the specification hereinabove or in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited.

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A thermoplastic elastomer composition, said composition comprising a continuous thermoplastic resin selected from the group consisting of nylon 6, nylon 11, nylon 12, nylon 6/12 copolymer, nylon 6/66 copolymer and mixtures thereof, said thermoplastic resin having a Young's modulus of more than 500 MPa and an air permeation coefficient of less than $60 \times 10^{-12}$ cc cm/cm$^2$ sec cmHg at 30° C., dispersed particles of at least one first elastomer comprising halogenated isobutylene-containing elastomer selected from the group consisting of halogenated butyl rubber and halogenated poly(isobutylene-co-p-methylstyrene) copolymer and dispersed particles of at least one second elastomer having at least one functional group capable of grafting to the continuous thermoplastic resin matrix, said at least one second elastomer selected from the group consisting of maleic anhydride grafted styrene-ethylene/butadiene-styrene rubber, maleated ethylene-propylene copolymer rubber, maleated ethylene-butene rubber, maleated ethylene-hexene rubber, maleated ethylene-octene rubber, maleated ethylene-decene rubber, maleated ethylene-vinyl acetate copolymer, maleated ethylene-methyl acrylate copolymer, maleated ethylene-ethyl acrylate copolymer, and maleated ethylene-acrylic acid copolymer dispersed in the continuous thermoplastic resin, said composition or said at least one first elastomer further comprising at least one stabilizer against degradation induced by exposure to ultraviolet rays, wherein said stabilizer consists of (i) (a) 2-(2H-benzotriazol-2-yl)-4,6-bis(1-methyl-1-phenylethyl)phenol or (b) 2-(2H-benzotriazol-2-yl)-4,6-ditert-pentylphenol and (ii) 3,5-di-t-butyl-4-hydroxybenzoic acid, hexadecyl ester.

2. The composition according to claim 1 wherein said stabilizer is dispersed in said halogenated elastomer or in said thermoplastic resin prior to said halogenated elastomer being dispersed in the thermoplastic resin by means of being dynamically vulcanized or during dynamic vulcanization of said halogenated elastomer.

3. The composition according to claim 2 wherein said halogenated elastomer further comprises at least one curing agent or a cure system suitable for crosslinking said halogenated elastomer.

4. The composition according to claim 1 wherein said halogenated elastomer is dispersed in said thermoplastic resin matrix in the form of particles having an average size of about 0.1 microns to about 1.0 microns and said second elastomer is dispersed in said thermoplastic resin matrix as particles having an average size of about 0.1 microns to about 1.0 microns.

5. The composition according to claim 1, wherein said second elastomer is selected from the group consisting of maleated ethylene-butene rubber, maleated ethylene-hexene rubber, maleated ethylene-octene rubber, maleated ethylene-decene rubber and maleated ethylene-ethyl acrylate copolymer and mixtures thereof.

6. The composition according to claim 5, wherein said second elastomer comprises maleic anhydride present in an amount of at least 0.01 wt % to a maximum amount selected from the group consisting of 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, and 2 wt % maleic anhydride.

7. The composition according to claim 1, wherein said second elastomer is present in an amount in a range selected from the group consisting of: 1 to 20 wt %, 0.5 to 20 wt %, 1 to 10 wt %, 5 to 15 wt %, and 7.5 to 12.5 wt %.

8. The composition according to claim 1 wherein said stabilizer is present at a concentration selected from the group consisting of about 0.1 to about 10 phr, about 0.1 to about 8.0 phr, 0.1 to about 7.5 phr, 0.1 to about 5.0 phr, 0.1 to about 3.5 phr, about 0.2 to about 6.5 phr, about 0.25 to about 5.0, about 0.25 to about 3.5 phr, about 0.25 to about 2.0 phr, about 0.25 to about 1.75 phr, and about 0.25 to about 1.5 phr.

9. The composition according to claim 1 further comprising at least one sterically hindered phenolic antioxidant.

10. The composition according to claim 9 wherein said antioxidant is selected from the group consisting of N,N'-hexane-1,6-diylbis(3-(3,5-di-tert-butyl-4-hydroxyphenyl)propionamide; pentaerythritol tetrakis(3-(3,5-di-tert-butyl-4-hydroxyphenyl)propionate); 2,2'-methylenebis(4-ethyl-6-tert-butyl)phenol; and 2,2'-methylenebis(4-methyl-6-tert-butyl)phenol.

11. The composition according to claim 1 wherein said thermoplastic resin is nylon 6/66 copolymer.

12. The composition according to claim 1 wherein said at least one halogenated isobutylene-containing elastomer is halogenated poly(isobutylene-co-p-methyl styrene) copolymer.

13. The composition of claim 1 prepared according to a dynamic vulcanization process conducted in a suitable mixer capable of applying shear to said polymer and elastomer components at elevated temperature, said process comprising the steps of: (1) dispersing in said halogenated elastomer at least one curing agent suitable for crosslinking said halogenated elastomer to provide a pre-compounded halogenated elastomer composition, using shear conditions, mixing time and a temperature sufficient to substantially uniformly disperse said curing agent, but insufficient to cause substantial crosslinking of said halogenated elastomer; (2) introducing said at least one thermoplastic resin into said mixer and applying sufficient shear and heat to cause the thermoplastic resin to melt and flow to form a thermoplastic resin mixture; (3) introducing at least one thermoplastic resin plasticizer in an amount sufficient to cause the viscosity of said thermoplastic resin mixture to substantially match the viscosity of said pre-compounded halogenated elastomer at the temperature and under the shear conditions present in said mixer; (4) introducing said pre-compounded halogenated elastomer into said mixer and applying heat and shear in sufficient quantity to initiate dynamic vulcanization of said halogenated elastomer; (5) introducing said second elastomer and continuing the heating and shearing to substantially disperse said second elastomer and substantially complete said dynamic vulcanization of said halogenated elastomer; and (6) delivering said dynamically vulcanized thermoplastic elastomer composition from said mixer; wherein at least one stabilizer is added to either the halogenated elastomer or the thermoplastic resin homopolymer or copolymer in step (1) or step (2).

14. The composition according to claim 13 wherein said halogenated elastomer is dispersed in said continuous thermoplastic resin matrix in the form of particles having an average size of about 0.1 microns to about 1.0 microns and said second elastomer is dispersed in said continuous thermoplastic resin matrix as particles having an average size of about 0.1 microns to about 1.0 microns.

15. The composition according to claim 13, wherein said second elastomer is selected from the group consisting of maleated ethylene-butene rubber, maleated ethylene-hexene rubber, maleated ethylene-octene rubber, maleated ethylene-decene rubber and maleated ethylene-ethyl acrylate copolymer and mixtures thereof.

16. The composition according to claim 14 wherein said polyamide is selected from the group consisting of nylon 6, nylon 11, nylon 6/66 copolymer and mixtures thereof; and said at least one halogenated isobutylene-containing elastomer is brominated poly(isobutylene-co-p-methylstyrene) copolymer.

* * * * *